_United States Patent Office_

3,795,744
Patented Mar. 5, 1974

3,795,744
FLAVOR VARIABLE CHEWING GUM AND METHODS OF PREPARING THE SAME
Koichi Ogawa and Hajime Kakuta, Tokyo, Japan, assignors to Lotte Co., Ltd., Tokyo, Japan
No Drawing. Filed June 25, 1971, Ser. No. 156,998
Claims priority, application Japan, Oct. 21, 1970, 45/92,148
Int. Cl. A23g 3/30
U.S. Cl. 426—3                              7 Claims

ABSTRACT OF THE DISCLOSURE

A chewing gum product having a variable flavor containing different seasonings including different spices in their conventionally available form together with seasonings which have been coated, encapsulated or combined with high molecular compounds such as polyvinyl esters.

BACKGROUND OF THE INVENTION

The present invention relates to a novel chewing gum product having flavor of improved variability and to a method of preparing the same.

Generally, the chewing gum is placed in the mouth for an extended period, so that if the flavor of the chewing gum could be varied during the chewing action the enjoyment of the chewer would be remarkably enhanced.

In the past, several methods have been proposed to provide a chewing gum having variable flavors. However, in the conventional flavor variable chewing gum, several different seasonings are simply mechanically mixed into the chewing gum base. Accordingly, when such chewing gum is chewed, different seasonings are released simultaneously together with the admixed flavors therein. Hence, a chewer can not taste the individual seasonings having distinct flavors since, as indicated, all the seasonings are released at the same time.

SUMMARY OF THE INVENTION

It is, therefore, a general object of the present invention to provide a new chewing gum product having flavors of improved variability.

In accordance with the present invention, the chewing gum product contains in its composition several different seasonings in their conventionally available form and in a form integrated with or coated with a high molecular compound so that seasonings in their conventionally available form and other different seasonings subjected to different treatments with the high molecular compounds are released in accordance with the time elapsed during the period of the chewing action.

A principal object of the present invention is to provide a flavor variable chewing gum product which contains seasonings in their conventionally available form and/or different seasonings subjected to different treatments with the high molecular compounds.

In one aspect of the present invention, the seasonings including spices are homogeneously dispersed, with agitation, in a solution of natural or synthetic high molecular compounds dissolved in a solvent therefor and thereafter subjected to pulverization to obtain integrated granules or alternatively to a coating treatment with natural or synthetic high molecular compounds to obtain coated or encapsulated seasonings which are then added to the chewing gum base together with the known additives including seasonings in their conventionally available form.

Another object of the present invention is, therefore, to provide a process for preparing a flavor variable chewing gum which comprises subjecting seasonings to a suspension dissolution; i.e. dispersing the seasonings with agitation in the dissolved natural or synthetic high molecular compounds and thereafter to pulverization to obtain integrated granules and mixing the resulting granules with the chewing gum base together with the known additives including seasonings in their conventionally available form but having different flavors than the integrated granules.

A further object of the present invention is to provide a method of preparing a flavor variable chewing gum which comprises subjecting seasonings to a coating treatment with natural or synthetic high molecular compounds to obtain coated or encapsulated seasonings and adding with blending the coated or encapsulated seasonings to the chewing gum base together with the known additives including seasonings in their conventionally available form but having different flavors than the coated or encapsulated seasonings.

Still a further object of the present invention is to provide a method of preparing a flavor variable chewing gum which comprises subjecting a second seasoning to suspension dissolution with at least one natural or synthetic high molecular compound and then to pulverization to obtain integrated granules of the second seasoning, subjecting the third seasoning to a coating treatment with at least one natural or synthetic high molecular compound to obtain a coated third seasoning, repeating the same procedure as to the third seasoning for a fourth seasoning to obtain an encapsulated fourth seasoning and then adding with blending the integrated second seasoning, the coated third seasoning, the encapsulated fourth seasoning to the chewing gum base together with the other chewing gum additives including the first seasoning in its commercially available form thereby to provide a chewing gum product containing four different seasonings and therefore four different flavors.

DESCRIPTION OF THE PREFERRED EMBODIMENTS

The term "seasonings" herein used means flavor ingredients for the chewing gum including sweetening agents, flavoring agents, salts, acidifying agents and other spices.

A few examples of useful sweetening agents are monosaccharides such as granular dextrose and the like, disaccharides such as powdered cane sugar and the like, polysaccharides such as powdered wheat gluten and the like and other synthetic seasonings such as saccharine, dulcin and the like.

Useful examples of the salts are the commercially available soy powder, Japanese miso powder, sauce powder and other salt powders prepared from various sources.

The acidifying agents preferably used in the present invention are powders of organic acids such as quenic acid, tartaric acid, malic acid, acetic acid and the like.

Useful examples of the spices are oil mints such as peppermint, spearmint and the like, essential oils extracted from oranges, lemons and other fruits, bean derived flavors such as coffee, cocoa and the like, wine flavors such as curacao zin and the like and the pungent materials such as affinin, pepper, mustard and the like.

Of the above pungent spices, an affinin or N-isobutyl-2,6,8-decatrieneamide may be more beneficially used to impart some refreshing pungent stimulation to the tongue. This affinin may be preferably mixed into the chewing gum product in the form of an oleo-resin, coated granule or encapsulated spice.

The water soluble natural high molecular compounds preferably used include starches, cellulose, proteins and gums, while polyvinyl alcohol may be used as a water soluble synthetic high molecular compound. Further, polyvinyl acetate, low molecular polyethylene and the like may be used as examples of water insoluble high molecular compounds.

Another class of synthetic high molecular compounds beneficially used in the present invention are polyvinyl esters and more particularly polyvinyl acetate, polyvinyl propionate, a graft-copolymer of polyvinyl propionate with vinyl acetate or a copolymer essentially of vinyl acetate with a small amount of ethylene, propylene, acrylic acid, methacrylic acid, crotonic acid, maleic acid and esters of unsaturated acids thereof, each having a polymerization degree of 200–1500 and all of the foregoing may also be used in the form of their mixtures.

In accordance with the present invention the polyvinyl esters may be combined with the seasonings by dissolving the polyvinyl esters in a solvent such as ethanol, ethyl acetate and the like to obtain a 2–30% by weight solution to which there is subsequently added with agitation the seasoning in an amount of at least 1–20 times the polyvinyl ester content to form a homogeneous dispersion, and then, a liquid miscible with said solution but immiscible with the polyvinyl ester, such as ether, hexane or the like, is slowly added alone or together with the said solution to the dispersion liquid so that the polyvinyl ester granules integrated with the seasonings are separated out in the form of non-adhesive particles in a form convenient for incorporation into the chewing gum base. However, a durable flavor may also be obtained by merely mechanically blending polyvinyl ester with the seasonings for pulverization.

The particle size of the high molecular compound integrated with the seasonings may be preferably selected from less than 20 mesh and notably less than 48 mesh. It will be appreciated that the particle size and the thickness and hardness of the coating layer of the granular products may be selectively varied to modulate the flavoring effect of the chewing gum.

In the typical embodiment for manufacturing the flavor variable chewing gum according to the present invention, the known chewing gum base resin such as polyvinyl acetate, polyvinyl propionate, ethyl cellulose, chicle, jetlutong or ester gum alone or in the form of their mixtures is added by blending with a plasticizer such as dibutylphthalate, butylphthalyl butyl glycolate, methylacetylcyanate or the like together with the other additives such as calcium carbonate, talc, wax, polyisobutylene, polybutylene under the heat to plasticize the blends as well as to modulate the hardness, viscoelasticity and the film formability of the chewing gum base.

The prepared chewing gum base is in turn added to the second seasoning integrated with the high molecular compound, the third seasoning coated with the high molecular compound and the fourth seasoning encapsulated in by the high molecular compound together with the known chewing gum additives including the first seasoning in its conventionally available form.

The present invention will be readily understood from a consideration of the following specific examples which are given for the purpose of illustration only and are not intended to limit the scope of the invention in any way.

EXAMPLE 1

| | Parts |
|---|---|
| Chewing gum base | 25.0 |
| Chewing gum additives | 74.0 |
| First spice (pine oil) | 0.5 |
| Second spice (encapsulated lemon oil) | 1.7 |

In accordance with the above compounding formulation, to the chewing gum base prepared by the known process was added sweetenings such as powder sugar, millet jelly and dextrose and then to the resulting chewing gum base there was added with blending pine oil as the first spice and the conventionally encapsulated lemon oil as the second spice and finally the resulting blend was rolled into the sheet chewing gum for cutting to obtain the chewing gum product having variable flavors.

At the beginning of the chewing action of the chewing gum thus prepared, the sweetenings together with the first spice were released in the mouth and then, when in proportion to the reduction of volume of the chewing gum, the chewing force increased, the encapsulated second seasoning agent was crushed to release the second spice so that the flavors of pine and lemon were enjoyed separated by some time transition.

EXAMPLE 2

| | Parts |
|---|---|
| Chewing gum base | 25.0 |
| Chewing gum additives | 74.0 |
| First spice (pine oil) | 0.3 |
| Second spice (encapsulated lemon oil) | 1.0 |
| Third spice (dried banana powder) | 2.6 |

In accordance with the above compounding formulation, the conventionally coated banana powder was added following the same procedure as defined in Example 1 to obtain a chewing gum product having three different flavors. On chewing the chewing gum product thus prepared, the three different flavors of pine, banana and lemon could be enjoyed separately, i.e., successively during the chewing period.

EXAMPLE 3

| | Parts |
|---|---|
| Chewing gum base | 25.0 |
| Chewing gum additives | 74.0 |
| First spice (pine oil) | 0.3 |
| Second spice (encapsulated orange) | 1.0 |
| Fourth spice (double coated strawberry powder) | 2.6 |

In accordance with the above compounding formulation, the conventionally double coated strawberry powder was added with blending to the chewing gum base together with the first and second spices to obtain a chewing gum product having three different flavors.

EXAMPLE 4

| | Parts |
|---|---|
| Chewing gum base | 25.0 |
| Chewing gum additives | 74.0 |
| First spice (pine oil) | 0.3 |
| Second spice (encapsulated lemon) | 0.7 |
| Third spice (banana powder) | 1.0 |
| Fourth spice (double coated strawberry powder) | 1.0 |

In accordance with the above compounding formulation, the first through fourth spices were added with blending to the chewing gum base to obtain a chewing gum product having four different flavors.

It will be appreciated that in the above examples, the first spice in its conventionally available form may be omitted and in that case the chewing gum product immediately on and after being subjected to the chewing action is substantially free from flavor.

Modification is possible in the selection of the particular materials employed and in the amount thereof as well as in the particular techniques.

What is claimed is:

1. A method of preparing a chewing gum characterized by variable release of different flavors which comprises the steps of dissolving approximately by weight 2–30% of a polyvinyl ester in a solvent therefor selected from the group consisting of ethanol, ethylacetate, and mixtures thereof, homogeneously dispersing a flavoring agent in an amount, by weight, at least 1–20 times the polyvinyl ester content in the resulting solution, adding to said solution a second solvent which is miscible with said first solvent but is a nonsolvent for said polyvinyl ester, said second solvent being selected from the group consisting of other, hexane and mixtures thereof, where said polyvinyl ester is precipitated out in the form of small particles which, in said precipitation, become integrated with the flavoring agent particles, isolating the combined particles of the polyvinyl ester and flavoring agent thus formed, and uniformly distributing said combined particles together with one or more additional but different flavoring agents characterized by a quicker release of flavor than said combined flavoring agent in a chewing gum base.

2. A method of preparing a chewing gum characterized by variable release of different flavors which comprises the steps of dissolving approximately by weight 2–30% of a polyvinyl ester in a solvent therefor selected from the group consisting of ethanol, ethylacetate, and mixtures thereof, homogeneously dispersing a flavoring agent in an amount, by weight, at least 1–20 times the polyvinyl ester content in the resulting solution, mixing said dispersion to form an emulsion of said flavoring agent in said solution, precipitating said polyvinyl ester whereby the precipitated polyvinyl ester encapsulates the flavoring agent particles to produce particles of encapsulated flavoring agent, isolating the encapsulated flavoring agent particles and uniformly distributing said particles together with one or more additional but different flavoring agents characterized by a quicker release of flavor than said encapsulated flavoring agent particles in a chewing gum base.

3. A method of preparing a chewing gum characterized by variable release of different flavors which comprises the steps of dissolving approximately by weight 2–30% of a polyvinyl ester in a solvent therefor selected from the group consisting of ethanol, ethylacetate, and mixtures thereof, adding to said solution an amount, by weight, of a flavoring agent, insoluble in said solution, of at least 1–20 times the polyvinyl ester content, mixing with agitation the resultant dispersion to form uniform mixture of said flavoring agent and said solution of polyvinyl ester and to effect coating of said flavoring agent particles with said solution, drying the resultant mixture to form particles of polyvinyl ester coated flavoring agent and uniformly distributing said particles together with one or more additional but different flavoring agents characterized by a quicker release of flavor than said coated flavoring agent in a chewing gum base.

4. A method of preparing a chewing gum characterized by variable release of different flavors which comprises the steps of uniformly distributing in a chewing gum base one or more flavoring agents selected from the group consisting of:

(a) combined particles of polyvinyl ester and flavoring agent prepared by dissolving approximately by weight 2–30% of a polyvinyl ester in a solvent therefor selected from the group consisting of ethanol, ethylacetate, and mixtures thereof, homogeneously dispersing a flavoring agent in an amount, by weight, at least 1–20 times the polyvinyl ester content in the resultant solution, adding to said solution a second solvent which is miscible with said first solvent but which is a nonsolvent for said polyvinyl ester selected from the group consisting of ether, hexane and mixtures thereof, whereby said polyvinyl ester is precipitated out as small particles which are integrated with the flavoring agent particles and isolating the combined particles of the polyvinyl ester and flavoring agent thus formed, (b) polyvinyl ester encapsulated flavoring agent particles prepared by dissolving approximately by weight 2–30% of a polyvinyl ester in a solvent therefor selected from the group consisting of ethanol, ethylacetate, and mixtures thereof, homogeneously dispersing a flavoring agent in an amount, by weight, of at least 1–20 times the polyvinyl content in the resulting solution, mixing said dispersion to form an emulsion of said flavoring agent in said solution precipitating said polyvinyl ester whereby the precipitated polyvinyl ester encapsulates the flavoring agent particles producing particles of the polyvinyl ester encapsulated flavoring agent and isolating the encapsulated flavoring agent particles, (c) polyvinyl ester coated flavoring agent particles prepared by dissolving approximately by weight 2–30% of a polyvinyl ester in a solvent therefor selected from the group consisting of ethanol, ethylacetate, and mixtures thereof, adding to said solution a flavoring agent in an amount, by weight, of at least 1–20 times the polyvinyl content, said flavoring agent being insoluble in said solution, mixing with agitation to form a uniform mixture of said flavoring agent particles and said solution of polyvinyl ester and to effect coating of said particles with said solution and drying the resulting mixture to form particles of polyvinyl ester coated flavoring agent, and uniformly distributing in the thusly obtained chewing gum product one or more additional flavoring agents characterized by a quicker release of flavor than any of said flavoring agents previously incorporated in said chewing gum base.

5. A method according to claim 4 wherein the particle size of said group members 1–3 is less than 20 mesh.

6. A method according to claim 4 wherein the particle size of said group members 1–3 is less than 48 mesh.

7. A method according to claim 4 wherein at least two of said group members are present.

References Cited
UNITED STATES PATENTS

| | | | |
|---|---|---|---|
| 2,886,446 | 5/1959 | Kramer et al. | 99—135 |
| 3,440,060 | 4/1969 | Rife et al. | 99—135 |
| 2,596,852 | 5/1952 | Heggie | 99—135 |
| 3,069,370 | 12/1962 | Jensen et al. | 99—135 X |
| 3,085,048 | 4/1963 | Bush | 99—135 X |
| 2,290,120 | 7/1942 | Thomas | 99—135 |

A. LOUIS MONACELL, Primary Examiner

J. M. HUNTER, Assistant Examiner

U.S. Cl. X.R.

426—221, 223